(12) United States Patent
Gruss et al.

(10) Patent No.: US 9,601,000 B1
(45) Date of Patent: Mar. 21, 2017

(54) DATA-DRIVEN ALERT PRIORITIZATION

(71) Applicant: EMC Corporation, Hopkinton, MA (US)

(72) Inventors: Eyal Gruss, Herzliya (IL); Alex Vaystikh, Hod Hasharon (IL); Eyal Kolman, Tel Aviv (IL); Alon Kaufman, Bnei-Dror (IL); Yael Villa, Tel Aviv (IL); Ereli Eran, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 687 days.

(21) Appl. No.: 14/039,875

(22) Filed: Sep. 27, 2013

(51) Int. Cl.
*G08B 23/00* (2006.01)
*G06F 11/00* (2006.01)

(52) U.S. Cl.
CPC .................... *G08B 23/00* (2013.01)

(58) Field of Classification Search
CPC ............................ G06F 21/577; G06F 212/552
USPC ............................................. 340/517; 726/22
See application file for complete search history.

(56) References Cited

U.S. PATENT DOCUMENTS

| 8,505,097 | B1 | 8/2013 | Juels et al. |
| 9,166,997 | B1 * | 10/2015 | Guo .................... H04L 63/1433 |
| 2014/0157405 | A1 * | 6/2014 | Joll ................................. 726/22 |
| 2016/0019388 | A1 * | 1/2016 | Singla .................... G06F 21/552 |
| | | | 726/23 |

OTHER PUBLICATIONS

Valeur et al., "A Learning-Based Approach to the Detection of SQL Attacks", Reliable Software Group, Department of Computer Science, University of California, Santa Barbara, {fredrik,dhm,vigna}@cs.ucsb.edu, pp. 1-18.
Alsubhi et al., "Security Configuration Management in Intrusion Detection and Prevention Systems", Int. J. Security and Networks, vol. 7, No. 1, 2012, pp. 30-39.
Porras et al., "A Mission-Impact-Based Approach to INFOSEC Alarm Correlation", SRI International, 333 Ravenswood Avenue, Menlo Park, CA, {porras, mwfong, valdes}@sdl.sri.com, pp. 1-19.

* cited by examiner

*Primary Examiner* — Jack K Wang
(74) *Attorney, Agent, or Firm* — BainwoodHuang

(57) ABSTRACT

A technique provides alert prioritization. The technique involves selecting attributes to use as alert scoring factors. The technique further involves updating, for an incoming alert having particular attribute values for the selected attributes, count data to represent encounter of the incoming alert from perspectives of the selected attributes. The technique further involves generating an overall significance score for the incoming alert based on the updated count data. The overall significance score is a measure of alert significance relative to other alerts. Scored alerts then can be sorted so that investigators focus on the alerts with the highest significance scores. Such a technique is well suited for adaptive authentication (AA) and Security Information and Event Management (SIEM) systems among other alert-based systems such as churn analysis systems, malfunction detection systems, and the like.

23 Claims, 5 Drawing Sheets

| Count By: | Aggregate On: | | | | | |
|---|---|---|---|---|---|---|
| | Source | Source Group | Destination | Destination Group | Source and Destination Groups | Alert Type |
| Unique Alert | 1 | 1 | 1 | 1 | 1 | 1 |
| Alert Type | 1 | 1 | 1 | 1 | 1 | N/A |
| Source | N/A | -1 | -1 | -1 | -1 | -1 |
| Source Group | N/A | N/A | N/A | N/A | N/A | -1 |
| Destination | 1 | 1 | N/A | N/A | 1 | -1 |
| Destination Group | 1 | 1 | N/A | N/A | N/A | -1 |

FIG. 3

DATA-DRIVEN ALERT PRIORITIZATION

BACKGROUND

Adaptive authentication (AA) involves computation of risk scores to authenticate users. Each risk score is a numerical measurement of risk, i.e., the likelihood that a particular user attempting to authenticate is not authentic. If the risk score is less than a predetermine threshold, authentication is considered successful and the user is considered legitimate. However, if the risk score is higher than the predetermine threshold, authentication is considered unsuccessful and a subsequent authentication action may be taken, e.g., the user may try to re-authenticate, the user may be challenged for a stronger form of authentication, and so on. Such activity may generate security alerts for evaluation from a human expert.

Security Information and Event Management (SIEM) refers to a security service which involves providing real-time analysis of security alerts. In particular, the SIEM service gathers, analyzes and presents security alert information to a team of expert humans which is responsible for monitoring and managing resources on a computer network.

SUMMARY

In certain security contexts such as AA and SIEM, conventional identification and evaluation of significant security threats often rely on intuition and memory of human experts. For example, human experts may sift through large numbers of security alerts such as warnings of failed login attempts, resource access attempts from new devices, and so on, as the human experts look for actual malicious activity. Unfortunately, many of the security alerts may be low-risk and/or false positives.

Some human experts may try to reduce the number of low-risk security alerts because they are so numerous by disabling certain noisy security alerts or rules which flag noisy events. Unfortunately, such alerts and rules may nevertheless deliver value from a security perspective and such disabling now makes the security alerts unavailable.

Improved techniques are directed to providing alert prioritization based on smart processing of attribute values associated with alerts. In particular, alerts are given significance scores, and are ranked based on the significance scores. Such significance scores can be determined based on aggregation of count data from the perspective of certain attributes. Once the alerts are ranked, the alerts can be prioritized to provide proper attention efficiently and effectively. For example, scored alerts can be sorted so that investigators focus on the alerts with the highest significance scores, i.e., attention can be focused on high-risk alerts over low-risk alerts, and false-positive alerts. As another example, prioritized alerts can be consolidated based on attributes in common to enable specific investigators to focus on similar and/or related activities. Such techniques are well suited for AA and SIEM systems among other alert-based systems such as churn analysis systems, malfunction detection systems, and so on.

One embodiment is directed to a method of providing alert prioritization. The method includes selecting, by processing circuitry, attributes to use as alert scoring factors. The method further includes updating, for an incoming alert having particular attribute values for the selected attributes and by the processing circuitry, count data to represent encounter of the incoming alert from perspectives of the selected attributes. The method further includes generating, by the processing circuitry, an overall significance score for the incoming alert based on the updated count data. The overall significance score is a measure of alert significance relative to other alerts.

In some arrangements, generating the overall significance score for the incoming alert includes combining individual partial significance scores to form the overall significance score. In these arrangements, each partial significance score is a measure of alert significance from a perspective of a particular selected attribute.

In some arrangements, generating the overall significance score for the incoming alert further includes, prior to combining the individual partial significance scores to form the overall significance score, combining internal scores to form the individual partial significance scores. In these arrangements, each internal score is based on metrics derived from the updated count data.

In some arrangements, generating the overall significance score for the incoming alert further includes, prior to combining the internal scores to form the individual partial significance scores, (i) computing sets of raw measures per attribute from the updated count data and (ii) deriving the metrics from the sets of raw measures computed per attribute. Examples of raw measures include a count-in-short-days measure based on a number of encountered occurrences of a particular attribute value in the last X days (X being an integer such as eight, or which is less than or equal to eight, etc.), a count-in-long-days measure based on a number of encountered occurrences of the particular attribute value in the last 10X days (i.e., 10 times X), and a count ratio which is the count-in-long-days measure divided by the count-in-short-days measure. Other examples of raw measures include a period-of-short-count measure which is a minimum time period containing two occurrences of the particular attribute value among two different alerts, a period-of-long-count measure which is a minimum time period containing 10 occurrences of the particular attribute value among 10 different alerts, and a period ratio which is the period-of-short-count measure divided by the period-of-long-count measure, among others.

In some arrangements, a list of current alerts includes the other alerts and overall significance scores generated for the other alerts. In these arrangements, the method further includes adding the incoming alert and the overall significance score to the list of current alerts. This list may serve as a historical log of alerts that can later be sorted, further processed, etc. for subsequent use.

For example, in some arrangements, the method further includes sorting alerts of the list of current alerts based on overall significance score to form a prioritized list of alerts to investigate. In some arrangements, the method further includes rendering a top portion of the prioritized list of alerts to an investigator to prioritize alert investigation.

In some arrangements, the method further includes combining alerts of the list of current alerts based on a common attribute to form a consolidated list of alerts to investigate. Such alerts may be consolidated because they are part of the same event or activity. Also, such alerts may be consolidated because they are similar and it makes sense for the same investigator or set of investigators to explore the same or similar alerts.

In some arrangements, the method further includes, prior to updating the count data to represent the encounter of the incoming alert from the perspectives of the selected attributes, receiving the incoming alert from an adaptive authentication engine. Such an engine is constructed and arranged to perform an adaptive authentication operation to authenticate a user based on a numerical risk score which indicates a measurement of risk that the user is not authentic.

In some arrangements, the method further includes, prior to updating the count data to represent the encounter of the incoming alert from the perspectives of the selected attributes, receiving the incoming alert from a Security Information and Event Management (SIEM) system. The SIEM system is constructed and arranged to provide real-time security alerts from a network environment.

It should be understood that, in the cloud context, the processing circuitry is formed by remote computer resources distributed over a network. Such a computing environment is capable of providing certain advantages such as enhanced fault tolerance, load balancing, processing flexibility, etc.

Other embodiments are directed to electronic systems and apparatus, processing circuits, computer program products, and so on. Some embodiments are directed to various methods, electronic components and circuitry which are involved in providing alert prioritization.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 3 is a block diagram of particular scoring details of the alert prioritization server of FIG. 2.

DETAILED DESCRIPTION

Overview

An improved technique is directed to providing alert prioritization based on smart processing of attribute values associated with alerts. In particular, alerts are given significance scores, and are ranked based on the significance scores. Such significance scores can be determined based on aggregation of count data from the perspective of certain attributes. Once the alerts are ranked, the alerts can be prioritized to provide proper attention efficiently and effectively. For example, scored alerts can be sorted so that investigators focus on the alerts with the highest significance scores, i.e., attention can be focused on high-risk alerts over low-risk alerts, and false-positive alerts. As another example, prioritized alerts can be consolidated based on attributes in common to enable specific investigators to focus on similar and/or related alerts. Such a technique is well suited for adaptive authentication (AA) and Security Information and Event Management (SIEM) systems among other alert-based systems such as churn analysis systems, malfunction detection systems, and so on.

Figure 1:
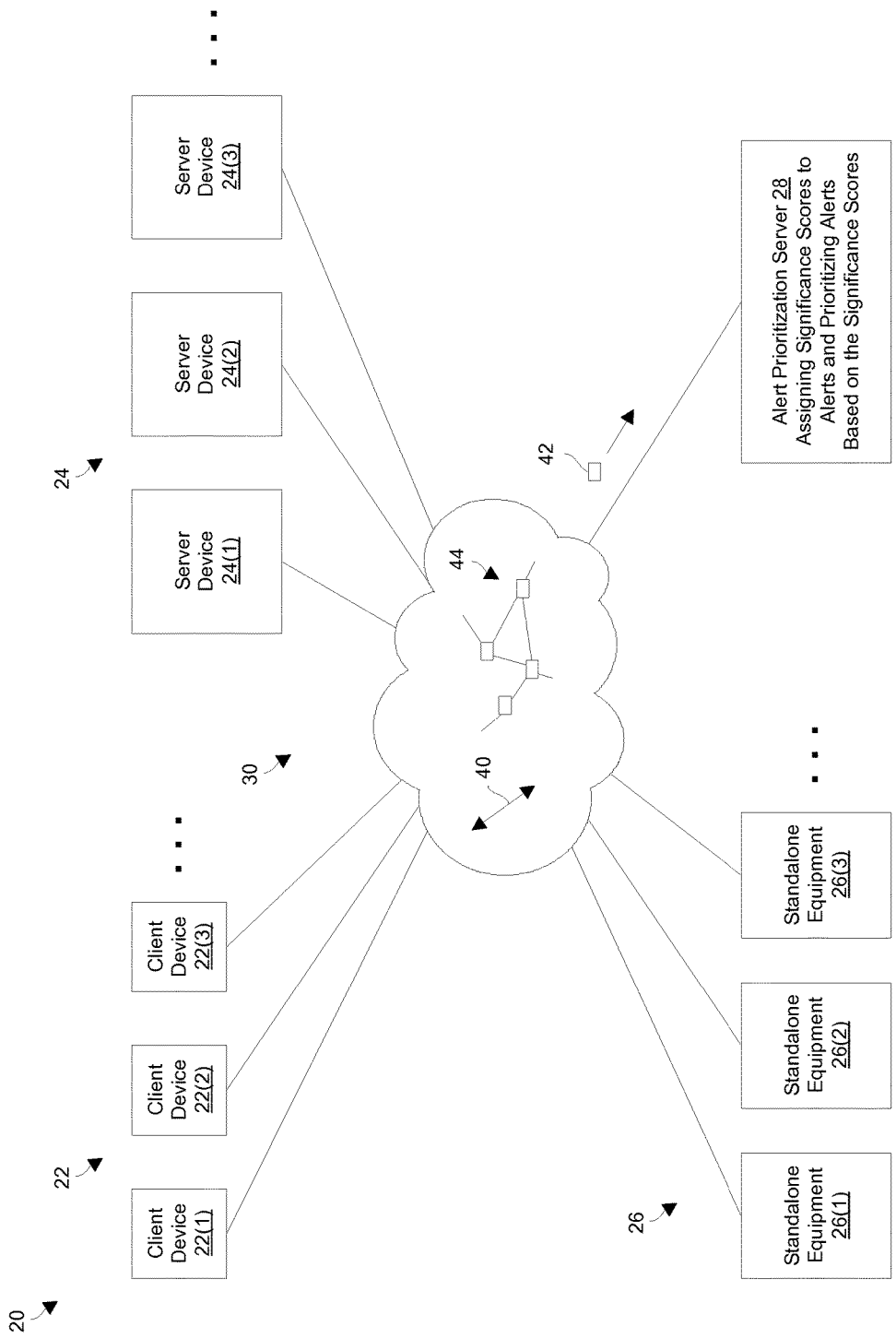
FIG. 1 is a block diagram of an electronic environment which is equipped for data-driven alert prioritization.

FIG. 1 shows an electronic environment 20 which is equipped for data-driven alert prioritization. The electronic environment 20 includes client devices 22(1), 22(2), 22(3), . . . (collectively, client devices 22), server devices 24(1), 24(2), 24(3), . . . (collectively, server devices 24), standalone equipment 26(1), 26(2), 26(3), . . . (collectively, standalone equipment 26), an alert prioritization server 28, and a communications medium 30.

Each client device 22 is constructed and arranged to acquire services from one or more of the server devices 24. Examples of suitable client devices 22 include computerized user operated devices such as personal computers, laptops, tablets, smart phones, television equipment, game consoles, and the like. Other examples of suitable client devices 22 include non-user operated computer equipment such as automated machinery and manufacturing equipment, security systems, automated backup systems, etc. which may communicate with a central controller or a central server.

Each server device 24 is constructed and arranged to provide services to one or more of the client devices 22. Examples of suitable server devices 24 include institutional or enterprise scale server apparatus such as data storage arrays, processing arrays, other service-provider equipment, server farms, control centers, etc.

Each of the standalone equipment 26 is constructed and arranged to operate independently, but may nevertheless need access to the communications medium 30 (e.g., for occasional network access). Examples of suitable standalone equipment 26 include door systems, camera systems, routers, gateways, firewalls, other network hardware, and so on.

The alert prioritization server 28 is constructed and arranged to receive alerts from the other components of the electronic environment 20, assign significance scores to the alerts, and prioritize the alerts based on the significance scores. As a result, an investigation team is able to focus attention on the most significant alerts.

The communications medium 30 is constructed and arranged to connect the various components of the electronic network 20 together to enable these components to exchange electronic signals 40 (e.g., see the double arrow 40). At least a portion of the communications medium 30 is illustrated as a cloud to indicate that the communications medium 30 is capable of having a variety of different topologies including backbone, hub-and-spoke, loop, irregular, combinations thereof, and so on. Along these lines, the communications medium 30 may include copper-based data communications devices and cabling, fiber optic devices and cabling, wireless devices, combinations thereof, etc. Furthermore, the communications medium 30 is capable of supporting LAN-based communications, SAN-based communications, cellular communications, combinations thereof, and so on.

During operation, the various components 22, 24, 26 of the electronic environment 20 perform a variety of operations to achieve useful work and, in certain situations, send alerts 42 to the alert prioritization server 28. Each alert 42 can take the form of a notification message indicating that an activity or event has occurred or been detected (e.g., an output from a sensor). As the alert prioritization server 28 receives each incoming alert 42, the alert prioritization server 28 updates count data to represent encounter of that incoming alert 42. Next, the alert prioritization server 28 generates an overall significance (or risk) score for the incoming alert 42 based on the updated count data. This overall significance score is a measure of alert significance relative to other alerts 42 earlier encountered by the alert prioritization server 28. Accordingly, users (e.g., alert investigators) are able to focus attention on the most significant alerts 42, i.e., focus on high-risk alerts 42 over low-risk alerts 42.

It should be understood that the electronic environment 20 is accurate for a variety of situations. For example, the electronic environment 20 describes a public network in which user computers (see the client devices 22) receive services from one or more resource servers (see the server devices 24). Along these lines, the user computers may access content from the server computers (e.g., files, videos, movies, songs, books, bank information, brokerage information, remote user accounts, VPNs, etc.). Additionally, the user computers may perform transactions (e.g., purchase products from online stores, pay bills, purchase stocks, etc.). Moreover, such situations may involve other devices (see the standalone equipment 26) such as security monitoring servers, firewalls and other network hardware, and so on. In these situations, the alert prioritization server 28 receives alerts 42 from the various components of the electronic environment 20 and prioritizes the alerts 42 for further investigation in order to prevent malicious activity in the future.

One will appreciate that, within the various situations described above, one or more components of the electronic environment 20 may be a source of alerts 42 warranting investigation. For example, various devices on a corporate network may provide alerts 42 during normal operation such as a detection of a new unknown device, a login attempt from an unfamiliar location, a user accessing a resource that the user has never accessed before, a user being blocked access to a restricted resource, and so on. As another example, an authentication server may provide alerts 42 during normal operation to identify significant events such as multiple failed authentication attempts by a particular user, a user trying to authenticate using a new user device, and so on. The improved technique is applicable to other types of alerts 42 as well since, as will be described in further detail shortly, the technique is based on basic attributes (or features) of an alert 42 (a generic alert).

It should be understood that in some arrangements, one or more of operations of the alert prioritization server 28 is distributed among the various components of the electronic environment 20. That is, all or part of the alert prioritization server 28 is implemented as an array (or fabric) of dedicated servers, dedicated appliances, and/or other devices (e.g., network hardware, devices performing additional/other functions, etc.) which monitor and log communications, process such logs, and produce alerts. Accordingly, the alert prioritization server 28 is not necessarily one centralized apparatus as shown in FIG. 1, but is distributed as a monitoring array across multiple devices, e.g., appliances located in various places 44 within the communication medium. Further details will now be provided with reference to FIG. 2.

Figure 2:
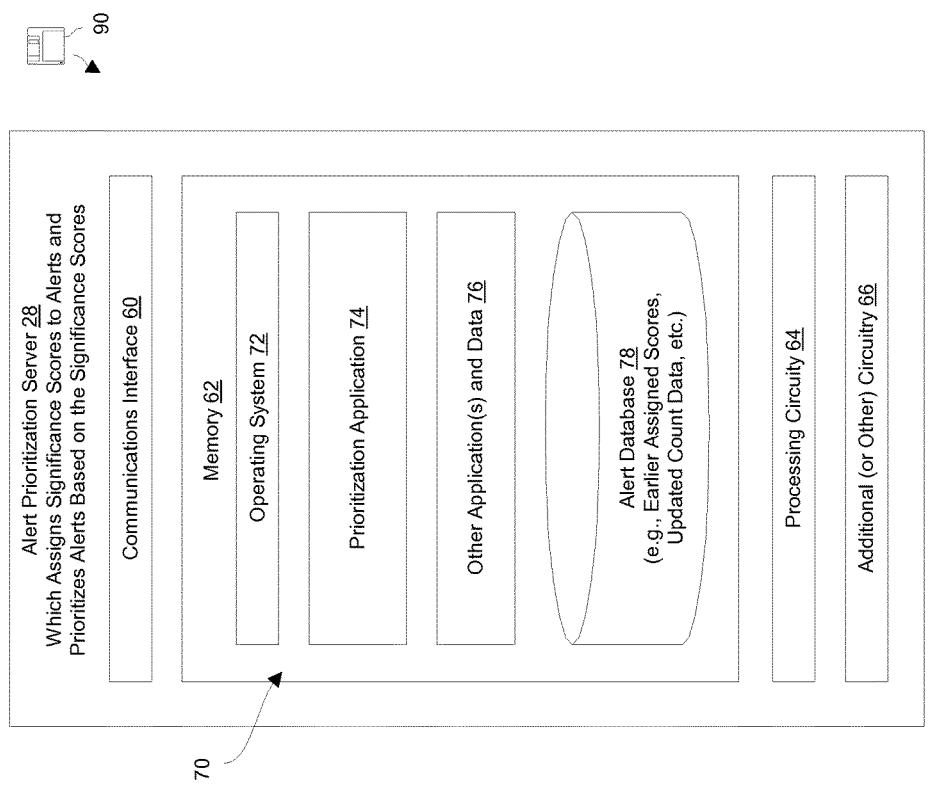
FIG. 2 is a block diagram of an alert prioritization server of the electronic environment of FIG. 1.

FIG. 2 shows particular details of the alert prioritization server 28 (also see FIG. 1). The alert prioritization server 24 includes a communications interface 60, memory 62, processing circuitry 64, and additional (or other) circuitry 66.

The communications interface 60 is constructed and arranged to connect the authentication server 24 to the communications medium 30 to enable communications with other components of the electronic network 20 (FIG. 1). Such communications may be IP-based, cellular-based, cable-based, combinations thereof, and so on. Accordingly, the communications interface 60 enables the authentication server 24 to receive alerts 42 from the other components for alert prioritization.

The memory 62 is intended to represent both volatile storage (e.g., DRAM, SRAM, etc.) and non-volatile storage (e.g., flash memory, etc.). The memory 62 stores a variety of software constructs 70 including an operating system 72 to manage resources of the alert prioritization server 28, a prioritization application 74 to prioritize incoming alerts 42, and other applications and data 76 (e.g., operating parameters, utilities, backend processing routines, etc.), and an alert database 78 (e.g., earlier generated and assigned scores, updated count data, etc.).

The processing circuitry 64 is constructed and arranged to operate in accordance with the various software constructs 70 stored in the memory 62. Such circuitry 64 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software constructs 70 to the alert prioritization server 28. The computer program product 90 has a non-transitory (or non-volatile) computer readable medium which stores a set of instructions which controls one or more operations of the alert prioritization server 28. Examples of suitable computer readable storage media include tangible articles of manufacture and apparatus which store instructions in a non-volatile manner such as CD-ROM, flash memory, disk memory, tape memory, and the like.

The additional circuitry 66 represents other portions of the authentication server 24. For example, the authentication server 24 may include a user interface to enable a user such as an investigator or team of investigators to enter input and receive output (user I/O) to operate the alert prioritization server 28.

During operation, the processing circuitry 64 runs the authentication application 74 to form specialized control circuitry which performs processes incoming alerts 42 from the other components 22, 24, 26 of the electronic environment 20. Initially, the control circuitry establishes particular attributes to use as scoring factors. As will be explained further below, the particular attributes include a source, a destination, an alert type (or rule), and a timestamp, perhaps among other attributes. In the context of a corporate network and prioritization of security alerts 42 from devices of the corporate network for further investigation to stop malicious activity in the future, these attributes (i.e., source, destination, alert type, and timestamp) can be considered necessary features of each alert 42. The control circuitry then maintains raw measures (e.g., counts, ratios, etc.) and scores based on these attributes in the alert database 78.

When the control circuitry of the alert prioritization server 28 receives an incoming alert 42, the control circuitry updates count data in the alert database 78 to represent encounter of the incoming alert 42 from perspectives of the selected attributes. Additionally, the control circuitry generates an overall significance score for the incoming alert 42 based on the updated count data. The overall significance score is a measure of alert significance and can be compared with those of other alerts 42 to enable the user to focus attention on the most significant alerts 42. Further details of the scoring processing will now be provided with reference to FIGS. 3 and 4.

Scoring and Additional Data Processing Details

Figure 4:
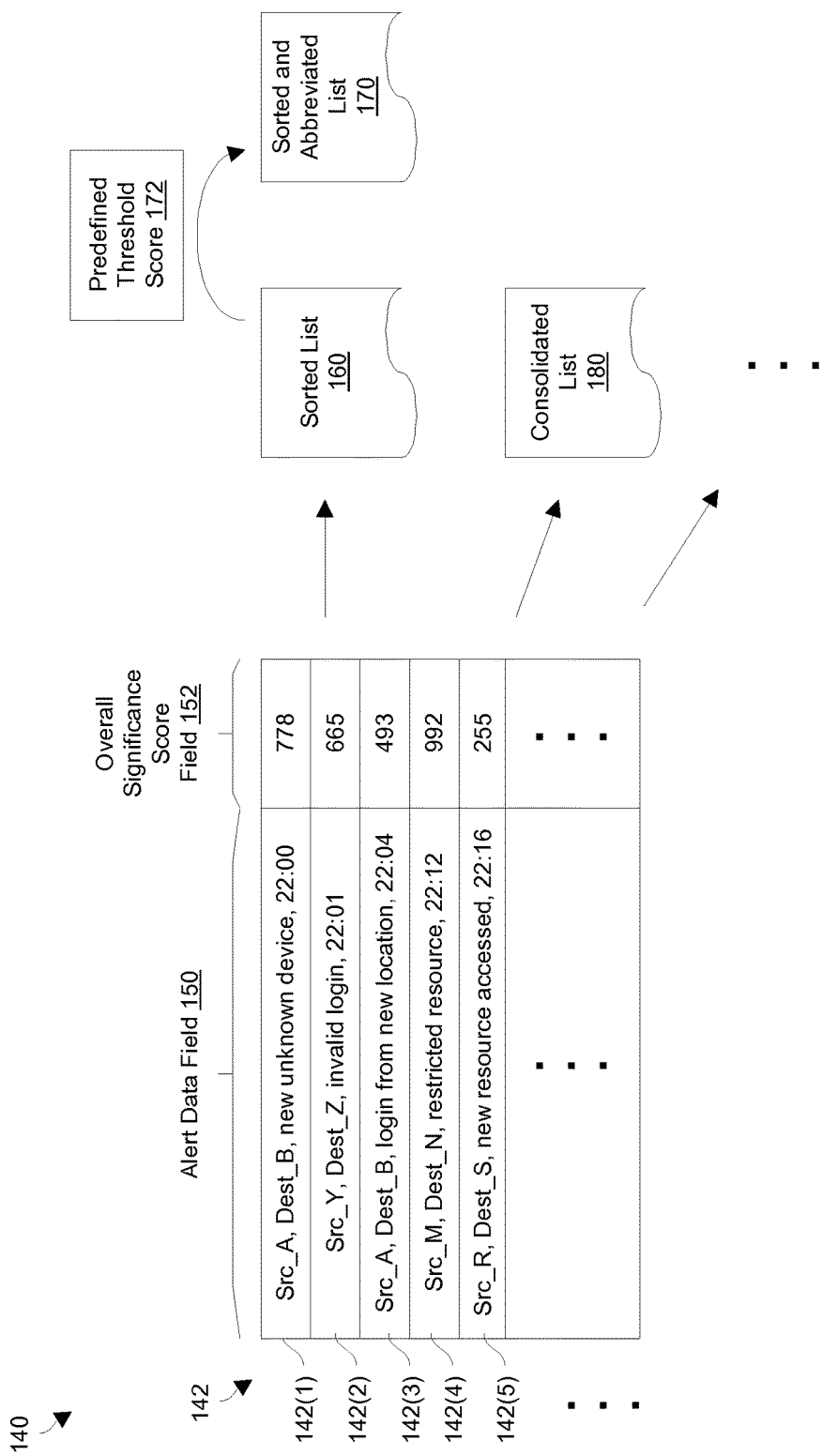
FIG. 4 is a block diagram of further scoring details of the alert prioritization server of FIG. 2.

FIGS. 3 and 4 provide particular details of how the control circuitry of the alert prioritization server 28 (i.e., the processing circuitry 64 running the prioritization application 74, also see FIG. 2) manages data and provides an overall significance score for each incoming alert 42. FIG. 3 shows particular details of an aggregation matrix 100 of the alert prioritization server 28. FIG. 4 shows further details of how the alert prioritization server 28 outputs prioritized alerts 42 for investigation to prevent malicious activity in the future.

FIG. 3 shows an aggregation matrix (or table) 100 which is stored in the memory 62 (also see other applications and data 76 in FIG. 2) and which logically represents how alert data is evaluated to generate an overall significance score in response to an incoming alert 42. The aggregation matrix 100 is divided into columns 102 and rows 104. Each column 102 of the aggregation matrix 100 is assigned an attribute for which the alert prioritization server 28 aggregates data. Each row 104 is assigned an attribute for which particular raw measures are computed from the perspective of row and column attributes.

The particular settings associated with the aggregation matrix 100 (e.g., "1", "−1", "N/A", etc.) indicate how updated count data is processed. In particular, "1" indicates application of analytics to detect high-volume, spike-like behavior. "−1" indicates application of analytics to detect low-level, uniform behavior. "N/A" indicates not relevant.

To further describe processing by alert prioritization server 28, the following description is provided in the context of monitoring alerts 42 of communications originating inside a corporate network. Nevertheless, it should be understood that other applications are suitable for use as well.

For communications in a corporate network setting, there certain basic (or core) attributes for a single communication act or event:

Source—The source IP address of the device originating the communication.

Destination—The destination IP address (or domain name).

Alert Type—A description (or details) of the alert triggered by the communication.

Timestamp—Time of the communication or of the alert.

The combination of specific attribute values for these basic attributes constitutes a unique alert.

Furthermore, the above-listed attributes may be adjusted (e.g., by truncation, by enrichment, etc.) to represent logically related groups of corresponding constructed (or enhanced) attributes. Possible constructed attributes include, by way of example:

Source Group—A superset of sources such as all devices of a user's business unit.

Destination Group—A superset of destinations such as all devices with a particular prefix in the destination IP address.

Alert Type Group—A superset or generalization of particular alert types such as alerts reporting unfamiliar devices (e.g., "login from unfamiliar location", "new unknown source", etc.), or alerts reporting blocked access (e.g., "insufficient privileges", "unsuccessful login", etc.), and so on.

Additionally, one may consider further intersections of attributes, e.g., all communications of the same source and destination group pair.

The above-listed basic and constructed attributes are used in the fashion where the alert prioritization server 28 selects an attribute and aggregates on that selected attribute (also see columns 102 in FIG. 3). In particular, after the alert prioritization server 28 selects an attribute in a column 102, the alert prioritization server 28 extracts statistics over the other attributes appearing in the rows 104. These statistics, which are referred to below as raw measures, are used to produce additional statistical features describing particular behavior within the corporate network over some period of time. Additionally, these statistics describe historical behaviors and behavioral changes, which can both affect the significance of the alert 42. Specifically, these raw measures describe the alert rate and occurrence distribution over time.

It should be understood that, for some attributes it is interesting to detect high alert rates with recent spikes. However, for other attributes, it is interested to detect low and uniform alert rates. The latter case is relevant, for example, for detecting beacon-like behavior and for promoting low-noise and solid rules.

The specific raw measures which are computed by the alert prioritization server 28 are as follows:

CSD=Count in Short Days=Number of distinct occurrences in the last 8 days

CLD=Count in Long Days=Number of distinct occurrences in the last 80 days

CR=Count Ratio=CLD/CSD

PSC=Period of Short Count=The minimal period to present containing 2 distinct occurrences PLC=Period of Long Count=The minimal period to present containing 10 distinct occurrences PR=Period Ratio=PSC/PLC A high CSD value and a low PSC value represent a high rate of occurrences. However, a low CR value and a low PR value represent a recent spike in occurrences. These raw measures are computed for each aggregate on-count by attributes pair in the aggregation matrix 100 of FIG. 3. Each raw measure is further normalized by dividing its raw instance value by the median of all instance values, i.e., derived metrics for use in determining internal scores.

For example, suppose that users Alex and Boaz each had two (2) unique alerts in the last eight (8) days, and that user Charlie had four (4) unique alerts in the last eight (8) days. In this example, the median is two (2) and the normalized CSD's (NCSD) are as follows: Alex=1, Boaz=1, and Charlie=2.

After normalization, the alert prioritization server 28 combines the raw measures multiplicatively (with an appropriate exponent sign) to produce an internal score for the specific attribute. The alert prioritization server 28 further calculates individual aggregator scores (i.e., partial significance scores) from the internal scores (i.e., the internal scores for each attribute aggregated on is combined into an aggregator score). Accordingly, there is a first aggregator score when aggregating on "Source", a second aggregator score when aggregating on "Source Group", and so on (see columns 102 in FIG. 3).

Then, the alert prioritization server 28 combines the individual aggregator scores together to produce the overall significance score for the alert 42. That is, the overall significance score for the alert 42 is calculated by geometric means over all attributes which are counted by, and all attributes which are aggregated on. Thus, by combining many simple indicators, a complex risk score model is produced which is able to capture various risky patterns. This risk score can then be used for alert prioritization and for removal of insignificant alerts as will now be described.

FIG. 4 shows a list 140 of generated alert entries 142(1), 142(2), 142(3), 142(4), 142(5), . . . (collectively, alert entries 142) which is maintained within the alert database 78 (also see FIG. 2). Each alert entry 142 includes (i) an alert data field 150 which contains alert data for an encountered alert 42 (i.e., a source value, a destination value, an alert description or code, and a timestamp value), and (ii) a overall significance score field 152 containing an assigned overall significance score 152.

By way of example only, the alert entries 142 are appended to the list 140 in the manner of a historical log.

Accordingly, the order of alerts 42 represented by the alert entries 142 tend to progress chronologically (e.g., timestamps of 22:00, 22:01, etc.).

When the alert prioritization server 28 receives a new incoming alert 42, the alert prioritization server 28 generates an overall significance score as described above, and adds a new alert entry 142 to the bottom of the list 140. Additionally, at any time, the alert entries 142 on the list 140 can be further processed in a manner which enables an investigator or team of investigators to efficiently and effectively focus attention.

For example, the alert prioritization server 28 can sort the alert entries 142 on the list 140 based on overall significance score to form a sorted list 160 of alert entries 142. The sorted list 160 ranks the alert entries based on significance (e.g., with the highest significance alert entries 142 at the top of the sorted list 160.

Furthermore, the alert prioritization server 28 can display a sorted and abbreviated list 170 based on the sorted list 160 of alert entries 142. For example, the alert prioritization server 28 can render the top X most significant alert entries 142 from the sorted list 170, X being a positive integer such as 5, 10, 25 etc. Alternatively, the alert prioritization server 28 can output only the alert entries 142 that exceed a predefined threshold score. Such operation enables effective removal of insignificant scores.

As another example, the alert prioritization server 28 can truncate or change the granularity of the alert data in the alert data field to form a consolidated list 180 of alert entries 142. Along these lines, the alert prioritization server 28 may consider any alert entries 142 that are within a particular amount of time (e.g., 10 seconds) involving the same source and destination as part of the same activity or event. Accordingly, the alert prioritization server 28 can consolidate alert entries 142(1) and 142(3), i.e., count the alert entries 142(1) and 142(3) as pertaining to a single unique alert and provide an output with the alert entries 142 grouped in this matter in the consolidated list 180. Other alert reports can be generated as well.

Examples

The following examples are provided in the context of alerts from communications over a corporate network. These examples describe interesting alert patterns, and describe how the alert prioritization server 28 deals with them. However, it should be understood that other situations are suitable as well.

In a first example, suppose that an attacker steals credentials of a legitimate user and uses it to log in to a company's internal network to obtain classified data. Multiple alerts would be triggered for this user such as (i) an alert 42 in response to detection of a new unknown device (e.g., see the client devices 22 in FIG. 1), (ii) an alert 42 in response to a user logging in from an unfamiliar location, (iii) an alert 42 in response to a user accessing resources the user has never accessed before (e.g., see the server devices 24 in FIG. 1), (iv) an alert in response to the user being blocked when trying to access restricted resources, and so on. It should be understood that these alerts 42 may be from different sources (e.g., a network device, an authentication server, a first resource server, a second resource server, etc.).

A conventional SIEM system might try to deal with these alerts 42 by applying a set of policies or rules such as "provide alert to the admin if user has more than X alerts".

However, with this conventional type of operation, the admin will always receive many alerts due to configuration issues, misbehaviors, etc.

In contrast, the alert prioritization server 28 considers not only the alerts 42 themselves, but also the distribution of the aggregating features, which enables the alert prioritization server 28 to lower the importance of false positive alerts. In particular, in this first example, the alert prioritization server 28 not only identifies that the user (i.e., the attacker) has many alerts, but more importantly indicates that this is an unusual situation for the legitimate user, and assigns high significance to these alerts 42, focusing the attention of the investigator (or analyst) to a possible breach attempt.

In a second example, suppose that an attacker aims at getting access to several specific resources. Along these lines, suppose that the attacker steals the network credentials of several legitimate users, and attempts to penetrate these resources.

In this second example situation, there will be an increasing number of alerts 42 on the resource servers (e.g., see the server devices 24 in FIG. 1), and on any user device that attempts to connect to the resource servers (e.g., see the client devices 22 in FIG. 1). The alert prioritization server 28 correlates between the different user devices and resource servers, identifies an increased number of alerts 42 over this group of user devices and resource servers, and assigns a higher severity to these alerts 42.

In a third example, suppose that a user device gets infected with malware, and the malware propagates to other devices that the user device communicates with. Multiple alerts 42 are triggered on activities of the infected users (i.e., by the user devices), resulting in an increase in the number of alerts 42 per this specific group. Accordingly, this change is identified by the alert prioritization server 28 and higher significance is assigned to these alerts 42.

Further Details

Figure 5:
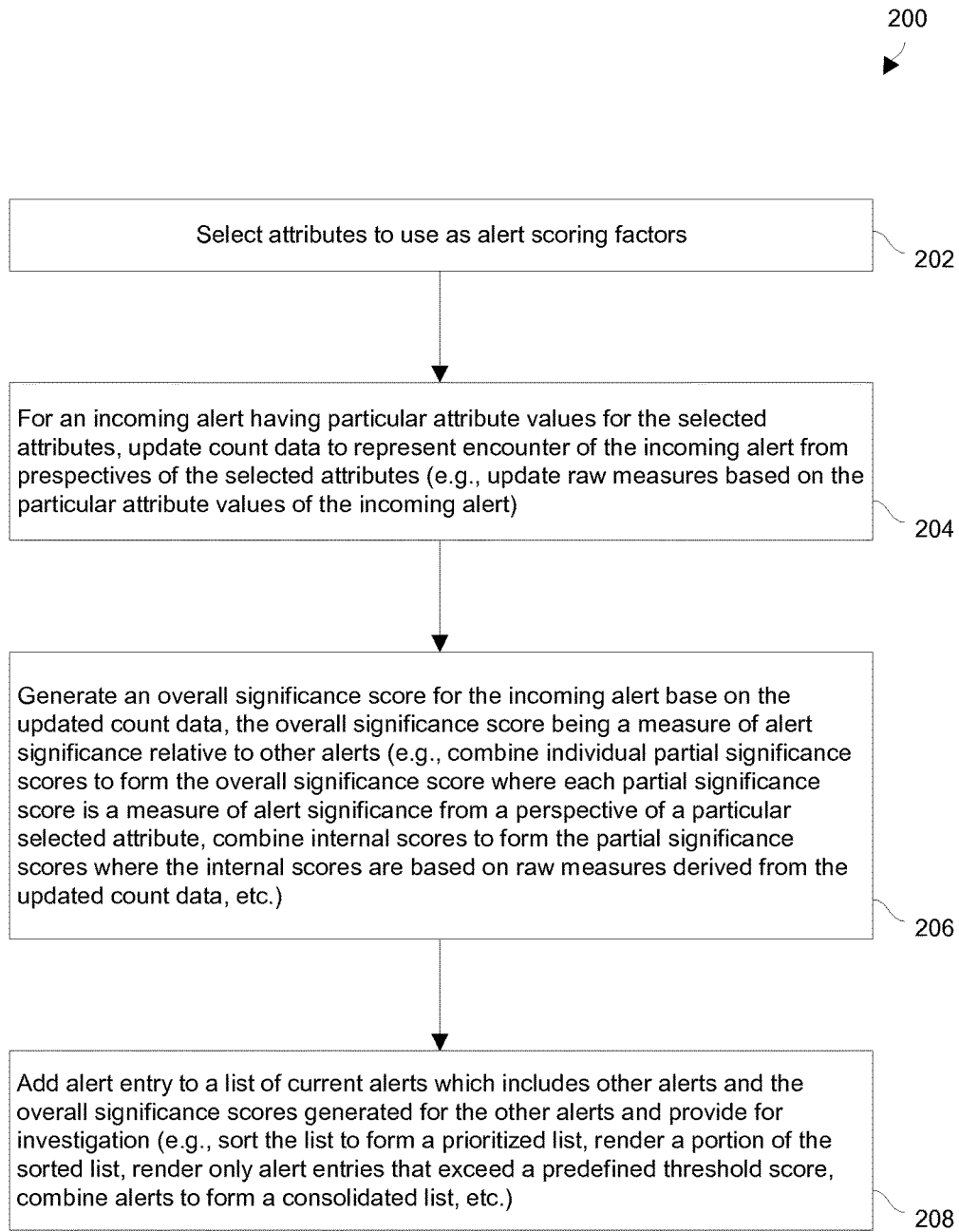
FIG. 5 is a flowchart of a procedure which is performed by the alert prioritization server of FIG. 2.

FIG. 5 is a flowchart of a procedure 200 which is performed by the alert prioritization server 28 when providing alert prioritization (also see FIGS. 1 and 2). In particular, the processing circuitry 64 runs the prioritization application 74 to form control circuitry which carries out the procedure 200.

At 202, the alert prioritization server 28 selects attributes to use as alert scoring factors. For example, in the context of processing security-related alerts 42 from communications in a corporate network, the alert prioritization server 28 uses basic attributes (e.g., source, destination, alert type, and timestamp), and constructed attributes (e.g., source group, destination group, alert type group, etc.).

At 204, the alert prioritization server 28 receives an incoming alert 42 and updates count data to represent encounter of the incoming alert 42 from perspectives of the selected attributes. That is, the alert prioritization server 28 updates raw measures and generates scores (e.g., metrics, internal scores, partial or aggregator scores, etc.) based on the particular attribute values of the incoming alert 42.

At 206, the alert prioritization server 28 generates an overall significance score for the incoming alert 42 based on the updated count data. The overall significance score is a measure of alert significance relative to other alerts 42. In particular, the overall significance score is based on combining individual partial significance scores to form the overall significance score, each partial significance score being a measure of alert significance from a perspective of a particular selected attribute. Additionally, each individual partial significance score is based on combining internal scores, each internal score being based on metrics (e.g., raw measures such as a count-in-short-days measure, count-in-long-days measure, a count ratio, a period-of-short-count measure, a period-of-long-count measure, a period ratio, etc.) derived from the updated count data, and so on.

At 208, the alert prioritization server 28 adds an alert entry 142 to a list 140 of current alerts 42 which includes other alerts 42 and the overall significance scores generated for the other alerts 42. During this step, the alert prioritization server 28 can sort alert entries 142 of the list 140 based on overall significance score to form a prioritized list 160 of alerts 42 to investigate. Additionally, the alert prioritization server 28 can render a top portion 180 of the prioritized list 170 of alerts 42 to an investigator to prioritize alert investigation (e.g., the top alerts 42 based on highest significance, all alerts 42 over a predefined threshold score, etc.). Furthermore, the alert prioritization server 28 can combine alerts 42 based on common attributes to form a consolidated list 180 of alerts 42 to investigate.

As described above, improved techniques are directed to providing alert prioritization based on smart processing of attribute values associated with alerts 42. In particular, alerts 42 are given significance scores, and are ranked based on the significance scores. Such significance scores can be determined based on aggregation of count data from the perspective of certain attributes. Once the alerts are ranked, the alerts 42 can be prioritized to provide proper attention efficiently and effectively. For example, scored alerts 42 can be sorted so that investigators focus on the alerts with the highest significance scores, i.e., attention can be focused on high-risk alerts over low-risk alerts, and false-positive alerts. As another example, prioritized alerts 42 can be consolidated based on attributes in common to enable specific investigators to focus on similar and/or related activities. Such techniques are well suited for AA and SIEM systems among other alert-based systems such as churn analysis systems, malfunction detection systems, and so on.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the alert-based electronic environment 20 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, one will appreciate that the above-described aggregated measures can describe historical behaviors and detect behavioral changes, which can both affect the significance of an alert 42. Specifically, these measures describe the alert rate and occurrence distribution over time. For some attributes, it is desirable to detect high alert rates with recent spikes. However, for other attributes, it is desirable to detect low and uniform alert rates. The latter case is relevant, for example, for detecting beacon-like behavior and for promoting low-noise and solid rules.

After some normalization, the measures are combined multiplicatively (e.g., with an appropriate exponent sign) to produce a risk score for the specific attribute. The overall alert risk score is calculated by geometric means over all attributes which are counted by, and all attributes which are aggregated on. Thus, by combining many simple indicators, a complex risk score model is achieved which is able to capture various risky patterns. This risk score is then used for prioritization of alerts 42 and for removal of insignificant alerts 42.

One should further appreciate that, in the context of the aggregation matrix 100 of FIG. 3, "1" designates attributes for which it is desirable to detect high rates and spikes of recent occurrences, and "−1" designates the converse. That is, in the particular scenario, a negative sign is assigned in all instances where it is desirable to count source-like attributes or aggregate on rule-like attributes.

For example, by aggregating on destination and counting distinct sources, it is possible to discover that malware.com (i.e., a bad domain) has a low and uniform source rate, and is thus more risky than company.com (i.e., a good domain). The signs of the attributes could be further fine-tuned using domain specific knowledge or feedback data.

It should be understood that it may be acceptable to ignore attributes counts which equal zero and attribute periods which are undetermined (infinity). Additionally, it may be acceptable to ignore alerts older than some cutoff period. Other domain specific exclusions may be appropriate as well, such as CR not being relevant when aggregating on dynamic IP addresses, or PR not being relevant if the overall number of distinct rules is small. Along these lines, measures which pass these criteria are considered relevant.

In some situations, different alert types may be associated with different prior severity scores. In this case, one may count an occurrence of an attribute associated with a riskier rule by a weight greater than 1 for the case of positive sign, and vice versa. For example, a high severity rule would be equivalent to 1.5 medium severity rules for the case of positive sign, and to 0.66 medium severity rules for the case of negative sign. Since distinct attributes are counted, and since each attribute may be associated with a different rule severity, the maximum severity associated with the attribute is taken. The internal risk score (or simply internal score, IS) is computed as:

$$IS = \left(\frac{NPSC \cdot NCR \cdot NPD}{NCSD}\right)^{\frac{sign}{\#measures}}$$

in which normalized measures are used, and "#measures" is the number of relevant measures. Also, non-relevant measures are replaced by 1, except for NCSD which is replaced by a smoothing factor such as 0.1. For each aggregator, the geometric mean (or partial significance or aggregator score, AS) is computed on all count by attributes:

$$AS = \left(\prod_{attributes} IS\right)^{\frac{1}{\#attributes}}$$

in which "#attributes" is the number of applicable attributes for the aggregator. Finally, the overall alert score is computed as the geometric mean on all aggregators:

$$RS = \left( \prod_{aggregators} AS \right)^{\frac{1}{\#aggregators}}$$

in which "#aggregators" is the number of basic aggregators in use for all alerts 42 (i.e. source, destination, rule), plus the number of constructed aggregators relevant for the specific alert 42. This risk score is used to prioritize the incoming alerts, where a smaller risk score indicates a riskier alert 42.

One will appreciate that a generalization of the flow of the technique is as follows:
1. Get a new incoming alert
2. For each aggregator:
    a. Append the alert data to that aggregator
    b. Calculate raw measures (CSD, CR, PSC, PR, etc.) and save them per attribute (but not per alert)
    c. Normalize measures and compute aggregate scores via counting and aggregating
3. Calculate the alert risk score
4. Optionally determine top alerts:
    a. Renormalize all alert scores using the saved attributes' raw measures
    b Consolidate alerts with common destinations (or if absent, common sources) and assign them a consolidated min risk score
    c. Display top alerts
5. Once daily recalculate the raw measures for all attributes With reference back to FIG. 3, the columns 102 of the aggregation matrix 100 correspond to attributes that the alert prioritization server 28 aggregates on. Additionally, the rows 104 of the aggregation matrix 100 correspond to attributes that the alert prioritization server 28 counts by.

So take for example that an alert 42 has been received by the alert prioritization server 28 and that "source" is the attribute that the alert prioritization server 28 is currently aggregating on (see the first column 102 in FIG. 3). For each attribute (see each row 104 in FIG. 3) to count on (as given by the aggregation matrix 100), the alert prioritization server 28 computes the raw measures CSD,CLD,CR,PSC,PLC,PR as earlier defined above. Along these lines, the alert prioritization server 28 performs a set of operations for the "unique alert" attribute (i.e., aggregating on "source" and counting by "unique alert"). Similarly, the alert prioritization server 28 performs another set of operations for the "alert type" attribute (i.e., aggregating on "source" and counting by "alert type"), and so on.

Once all of the raw measures have been computed when aggregating on "source", internal scores (IS) are generated from the raw measures. In particular, the alert prioritization server 28 generates an internal score for every attribute which was counted on when aggregating on "source" using the computed raw measures. Next, the alert prioritization server 28 combines the internal scores to form an aggregator score (AS) for "source". This aggregator score is a partial significance score derived by aggregating on "source".

The alert prioritization server 28 repeats this process for all of the other attribute columns 102 of the aggregation matrix 100 (i.e., for source group, destination, destination group, etc.) until the alert prioritization server 28 has generated an aggregator score for each attribute (i.e., for each column 102). As the alert prioritization server 28 performs each process, it should be understood that normalization can be performed during that process. The alert prioritization server 28 then combines these individual aggregator scores to form the overall significance score for the alert 42, and the overall significance score can be compared to those of other alerts 42 to prioritize attention for further investigation (also see FIG. 4).

The above-described technique provides a comprehensive generic solution with minimal necessity for domain specific knowledge. Hence, such a technique is applicable for many different domains (such as cyber-security and financial fraud detection) with minimal integration efforts. Additionally, when integrating with other alerting systems, new features can be easily added to the technique due to its generic methodology. Such modifications and enhancements are intended to belong to various embodiments of the disclosure.

What is claimed is:

1. A method of providing alert prioritization, the method comprising:
selecting, by processing circuitry, attributes to use as alert scoring factors;
for an incoming alert having particular attribute values for the selected attributes, updating, by the processing circuitry, count data to represent encounter of the incoming alert from perspectives of the selected attributes; and
generating, by the processing circuitry, an overall significance score for the incoming alert based on the updated count data, the overall significance score being a measure of alert significance relative to other alerts,
wherein a list of current alerts includes other alerts and overall significance scores generated for the other alerts, and wherein the method further comprises:
adding the incoming alert and the overall significance score to the list of current alerts; and
sorting alerts of the list of current alerts based on overall significance score to form a prioritized list of alerts to investigate.

2. A method as in claim 1 wherein generating the overall significance score for the incoming alert based on the updated count data includes:
combining individual partial significance scores to form the overall significance score, each partial significance score being a measure of alert significance from a perspective of a particular selected attribute.

3. A method as in claim 2 wherein generating the overall significance score for the incoming alert based on the updated count data further includes:
prior to combining the individual partial significance scores to form the overall significance score, combining internal scores to form the individual partial significance scores, each internal score being based on metrics derived from the updated count data.

4. A method as in claim 3 wherein generating the overall significance score for the incoming alert based on the updated count data further includes:
prior to combining the internal scores to form the individual partial significance scores, (i) computing sets of raw measures per attribute from the updated count data and (ii) deriving the metrics from the sets of raw measures computed per attribute.

5. A method as in claim 4 wherein computing the sets of raw measures per attribute from the updated count data includes:
calculating a count-in-short-days measure based on a number of encountered occurrences of a particular attribute value in the last X days, X being an integer which is less than or equal to eight.

6. A method as in claim 5 wherein computing the sets of raw measures per attribute from the updated count data further includes:
calculating a count-in-long-days measure based on a number of encountered occurrences of the particular attribute value in the last 10X days.

7. A method as in claim 6 wherein computing the sets of raw measures per attribute from the updated count data further includes:
dividing the count-in-long-days measure by the count-in-short-days measure to provide, as a raw measure, a count ratio for the particular attribute value.

8. A method as in claim 4 wherein computing the sets of raw measures per attribute from the updated count data includes:
calculating, as a period-of-short-count measure, a minimum time period containing two occurrences of the particular attribute value among two different alerts.

9. A method as in claim 8 wherein computing the sets of raw measures per attribute from the updated count data further includes:
calculating, as a period-of-long-count measure, a minimum time period containing 10 occurrences of the particular attribute value among 10 different alerts.

10. A method as in claim 9 wherein computing the sets of raw measures per attribute from the updated count data further includes:
dividing the period-of-short-count measure by the period-of-long-count measure to provide, as a raw measure, a period ratio for the particular attribute value.

11. A method as in claim 4 wherein computing the sets of raw measures per attribute from the updated count data includes:
calculating a count-in-short-days measure based on a number of encountered occurrences of a particular attribute value in the last X days,
calculating a count-in-long-days measure based on a number of encountered occurrences of the particular attribute value in the last 10X days,
dividing the count-in-long-days measure by the count-in-short-days measure to provide, as a raw measure, a count ratio for the particular attribute value,
calculating, as a period-of-short-count measure, a minimum time period containing two occurrences of the particular attribute value among two different alerts,
calculating, as a period-of-long-count measure, a minimum time period containing 10 occurrences of the particular attribute value among 10 different alerts, and
dividing the period-of-short-count measure by the period-of-long-count measure to provide, as a raw measure, a period ratio for the particular attribute value.

12. A method as in claim 11 wherein computing the sets of raw measures per attribute from the updated count data includes:
calculating a count-in-short-days measure based on a number of encountered occurrences of another attribute value in the last X days,
calculating a count-in-long-days measure based on a number of encountered occurrences of the other attribute value in the last 10X days,
dividing the count-in-long-days measure by the count-in-short-days measure to provide, as a raw measure, a count ratio for the other attribute value,
calculating, as a period-of-short-count measure, a minimum time period containing two occurrences of the other attribute value among two different alerts,
calculating, as a period-of-long-count measure, a minimum time period containing 10 occurrences of the other attribute value among 10 different alerts, and
dividing the period-of-short-count measure by the period-of-long-count measure to provide, as a raw measure, a period ratio for the other attribute value.

13. A method as in claim 1, further comprising:
sorting alerts of the list of current alerts based on overall significance score to form a prioritized list of alerts to investigate.

14. A method as in claim 13, further comprising:
rendering a top portion of the prioritized list of alerts to an investigator to prioritize alert investigation.

15. A method as in claim 1, further comprising:
combining alerts of the list of current alerts based on a common attribute to form a consolidated list of alerts to investigate.

16. A method as in claim 1, further comprising:
prior to updating the count data to represent the encounter of the incoming alert from the perspectives of the selected attributes, receiving the incoming alert from an adaptive authentication engine which is constructed and arranged to perform an adaptive authentication operation to authenticate a user based on a numerical risk score which indicates a measurement of risk that the user is not authentic.

17. A method as in claim 1, further comprising:
prior to updating the count data to represent the encounter of the incoming alert from the perspectives of the selected attributes, receiving the incoming alert from a Security Information and Event Management (SIEM) system which is constructed and arranged to provide real-time security alerts from a network environment.

18. An electronic apparatus, comprising:
memory; and
processing circuitry coupled to the memory, the memory storing instructions which, when carried out by the processing circuitry, cause the processing circuitry to:
select attributes to use as alert scoring factors,
for an incoming alert having particular attribute values for the selected attributes, update count data to represent encounter of the incoming alert from perspectives of the selected attributes,
generate an overall significance score for the incoming alert based on the updated count data, the overall significance score being a measure of alert significance relative to other alerts,
maintain a list of current alerts including other alerts and overall significance scores generated for the other alerts, and
add an incoming alert and the overall significance score to the list of current alerts.

19. A computer program product having a non-transitory computer readable medium which stores a set of instructions to provide alert prioritization, the set of instructions, when carried out by computerized circuitry, causing the computerized circuitry to perform a method of:
selecting attributes to use as alert scoring factors;
for an incoming alert having particular attribute values for the selected attributes, updating count data to represent encounter of the incoming alert from perspectives of the selected attributes;
generating an overall significance score for the incoming alert based on the updated count data, the overall significance score being a measure of alert significance relative to other alerts;

maintaining a list of current alerts including other alerts and overall significance scores generated for the other alerts; and adding an incoming alert and the overall significance score to the list of current alerts.

20. A method as in claim 4, wherein combining individual partial significance scores to form the overall significance score includes forming the overall significance score as a geometric mean of the partial significance scores, wherein combining the internal scores to form the individual partial significance scores includes forming each individual partial significance score as a geometric mean of the internal scores for that partial significance score, and wherein each individual internal score is formed as a geometric mean of a corresponding combination of the derived metrics.

21. A method as in claim 18, wherein the method further comprises reading stored data for an internal score that specify a manner of combining derived metrics in the corresponding combination of the derived metrics for that internal score, wherein the stored data for that internal score indicate whether a least one of the derived metrics is relevant to that internal score, wherein the stored data specify, for a derived metric that is relevant to the internal score, a data element indicating whether to include (i) the relevant derived metric, as indicated by the data element having a first value, or (ii) an inverse value of the relevant derived metric, as indicated by the data element having a second value, in the combination of the derived metrics corresponding to the internal score, and wherein any of the derived metrics that is not relevant to a particular internal score is excluded from the combination of the derived metrics for the internal score.

22. A method as in claim 21, wherein deriving the metrics from the sets of raw measures computed per attribute comprises:

computing a set of median values of the sets of raw measures computed per attribute; and normalizing the sets of raw measures computed per attribute by the set of median values computed per attribute.

23. A method as in claim 1 wherein the method further comprises:

prior to adding the incoming alert and the overall significance score to the list of current alerts, generating new overall significance scores of a set of the other alerts based upon the updated count data; and in response to detecting a change in the overall significance score of any of the set of other alerts, adjusting an ordering of alerts in the prioritized list of alerts to reflect changes in the overall significance scores.

* * * * *